J. P. SUMMERS,
Assignor to J. D. LOOMIS & P. NYMAN.
Boring and Drilling Wells.
No. 9,660. Reissued April 12, 1881.
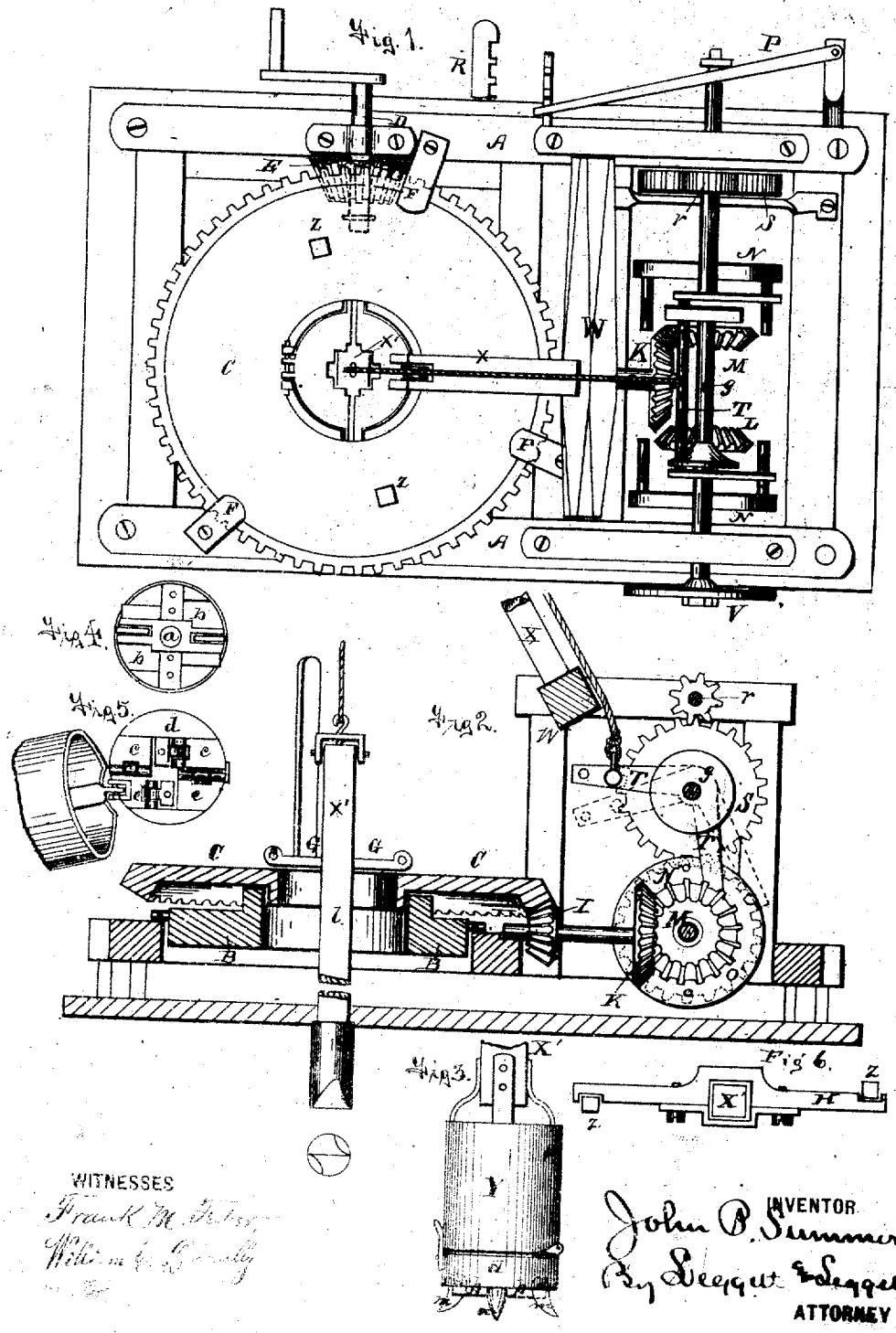
WITNESSES
Frank M. Dickerson
William E. Connally
INVENTOR
John P. Summers,
By Seegert & Seegert
ATTORNEY

UNITED STATES PATENT OFFICE.

JOHN P. SUMMERS, OF TIFFIN, OHIO, ASSIGNOR TO JOHN D. LOOMIS AND PHILETUS NYMAN, OF SAME PLACE.

BORING AND DRILLING WELLS.

SPECIFICATION forming part of Reissued Letters Patent No. 9,660, dated April 12, 1881.

Original No. 94,923, dated September 14, 1869; reissue No. 8,390, dated August 27, 1878. Application for reissue filed May 12, 1880.

*To all whom it may concern:*

Be it known that I, JOHN P. SUMMERS, of Tiffin, in the county of Seneca and State of Ohio, have invented a new and useful Improvement in Rock-Drills and Well-Boring Machines and Well-Augers, which improvement is fully set forth in the following specification, reference being had to the accompanying drawings.

The nature of my invention consists in the arrangement of certain devices so as to form a machine for boring and drilling wells and sinking piping, as will be hereinafter fully set forth and described.

Figure 1 is a plan view of my machine. Fig. 2 is a section view of the same. Fig. 3 is a side view of the well-auger. Fig. 4 is a bottom view of the same. Fig. 5 is a plan view of the bottom, showing arrangement of the valves. Fig. 6 is a plan view of the arm by means of which the auger is operated.

A represents the frame of my machine, which may be of any size or shape desired. At one end of this frame is placed the bed-piece B, upon which the master-wheel C rests and revolves. In the center of this bed there is a large circular opening made, through which the augers and drills are lowered and raised, and is provided with a collar upon its rim, so as to receive the flange upon the bottom of the master-wheel C. In the master-wheel C, above the bed B, there is also an opening corresponding to that in the bed, and for the same purpose, as it is intended the center of the wheel shall be placed over the center of the well.

Upon one side of the frame A is placed a short shaft, D, to which the motive power is applied for running or operating the machine. To the inner end of this shaft there is attached a small cog-wheel, E, which gears in and communicates the motion to the master-wheel C. This wheel C is placed upon the bed-piece B in such a manner as to allow it to revolve freely around for the purpose of operating the augers and drills, and also giving motion to the other parts of the machine. In order to retain this wheel in its proper position it is cast with a circular flange upon its under side, which runs around the opening in its center and fits in the neck upon the bed-piece B; and secured to the frame are a number of clasps, F, to hold it down.

The circular opening already described, in the center of the master-wheel, is provided with two semicircular doors, G, pivoted or bolted on, so that they can be opened or closed at pleasure. A square aperture or opening is made through them, so that when closed they will grasp the shaft X′ connected to the auger, and as the wheel revolves the auger will thus be made to bore. As this shaft will consist of a great many pieces which will have to be secured firmly together by bolts passing through, and then have nuts screwed upon their ends, upon each side of this opening, there is a small notch, so as to allow these bolt-heads and nuts to pass. Rising from the top of this wheel there are two upright posts or pillars, Z Z, placed upon opposite sides of the opening, which catch the ends of the arm *h* upon the auger-shaft, and thus assist in turning and operating it.

As will readily appear, the office of the doors G and the uprights Z Z is the same—viz., a means for turning the auger—the first by operating directly upon the shaft X′, and the second by operating upon the shaft through the arm H, adapted to slide up and down upon it. Either of these means may be employed for turning the auger, or both may be employed together without departing from my invention.

Upon the lower rim of this master-wheel are cogs, for the purpose of receiving motion from wheel E, and then, in turn, imparting it to wheel I.

Attached to the same shaft as the wheel I, upon the opposite end, is placed the miter-wheel K, which gears in two other wheels, L M, for the purpose of lowering and raising the drills and augers. Upon the same shaft, which extends from one side of the frame out through on the other, are placed two disks, N, the cog-wheel O, as shown by dotted lines in Fig. 2, and upon its outer end the lever P. By means of this lever the wheels L and M are thrown in and out of gear. Extending out from the side of the frame there is a metal plate, which has three notches cut in its upper edge for the purpose of holding the lever at any desired place.

When swung far enough around so as to catch in the notch nearest to the frame the wheel M is thrown into gear with the wheel K, so as to elevate or raise the drills from the hole. When in the middle one it throws the drills entirely out of gear; but when in the outer notch the wheel L is thrown into gear, so as to lower the drills.

Placed immediately above the cog-wheel O there is a second one of the same size, which gears with it.

Upon the same shaft as the wheel S there is placed a tilting frame, T, and a reel, upon which the rope or chain connected to the drills is wound. This tilting frame consists of two pieces, bent in the shape of a square, and connected by a rod which has a loop or staple attached to it. The other two ends hang down, so that the long arms or projections upon the two disks will give it a reciprocating motion.

Extending across the frame there is a third shaft, provided with a small cog-wheel, *r*, so as to mesh in with the one S, upon the outer end of which is placed a ratchet, V, which will be controlled by a pawl, so as to hold the auger or drill when elevated.

Pivoted between two parts of the frame there is a cross-piece, W, to which is attached a derrick-pole, X, provided at its upper end with a pulley, over which the rope or chain passes. This pole X can be raised or lowered to any angle, and is used to raise and lower the drills or augers.

Letter Y, Fig. 3, is the auger I use in boring wells. This auger consists of a large cylinder having a movable bottom, secured to one side of the cylinder by a hinge and to the other by a catch. In this bottom are placed the cutters, as seen in Fig. 4. Across the bottom of this cylinder are two bars, placed at right angles with each other, through which the auger-point *a* is placed. Extending down below the edge of the bottom are two auger-blades, *b*, which not only cut the earth loose, but convey it upward into the cylinder. Upon the top of this movable bottom are two double valves, *c*, which are formed like small trap-doors, two being pivoted together. As the earth is conveyed upward by these blades *b* these doors or valves will be forced open, so as to let it pass upward, but will remain closed as soon as the cylinder is lifted upward, by the weight of the earth. The shaft which is connected to this cylinder can be lengthened at pleasure by the addition of other pieces, and is provided with an arm, H, Fig. 6. This arm consists of a long rod made with a square hole in its center large enough to allow the arm to slip loosely upon the auger-shaft. Near each end, but upon opposite sides, are slots cut in so as to receive the projections upon the master-wheel C. Clasping the top of this shaft and of the drills there is a metal brace or clasp, in the top of which is a small hook or staple, fastened in such a manner that the shaft or drills can be turned without twisting the rope or chains.

The movable cutters *m m* are for use in sand when it becomes necessary to case the well as the boring progresses. The office is to cut the hole enough larger than the auger to permit the piping to slip readily over the auger. These cutters are pivoted in the cross-pieces across the bottom cylinder, as shown in Fig. 4, and in such a way that they will drop, by gravity, to a position pendent from the bottom of the auger when unobstructed, as when being drawn from the well, while, on the other hand, as the auger comes in contact with the earth they will be driven outward and cut a hole as much larger than the auger as required, the size of the hole only depending upon the length of the cutters *m m*.

The operation of my machine is as follows: When I desire to bore a well I use the auger Y. The machine is placed over the spot where it is intended to sink the well, so that the opening in the master-wheel C will come directly over it. The doors G are then opened and the auger inserted. The lever P is made to catch in the middle notch in the serrated plate R, so as to throw all the rest of the machinery out of gear until it is desired to use it. The motive power is then applied to the shaft D, through which the motion is communicated to the master-wheel C. As this wheel revolves the two projections upon its face catch the arm H, causing the auger to revolve also. As soon as the cylinder has been filled with earth the lever P is moved over so as to catch in the notch nearest to the frame, so as to throw the wheel M in gear with the wheel K. As the rope or chain to which the auger is attached passes over the pulley on the end of the derrick X, and then is secured to the reel *g*, as soon as this is set to revolving the auger is raised from the hole. The movable bottom *b* is then unfastened and allowed to swing down and the earth allowed to drop out, when it is again ready to bore. The lever is then moved outward, so as to catch in the last notch, which brings the wheel L into gear, which causes the reel to unwind and lower the auger into the hole again.

When it is desired to use the machine for drilling instead of boring the auger is removed and the drill *l* attached to the end of the chain or rope, while the other end of said rope or chain is removed from the reel and attached to the hook in the tilting frame T. The doors G are closed, so as to serve as a guide to the drill and impart to it a rotary motion. As soon as the machine is set in motion the long arms upon the two disks N, in revolving, engage with the tilting frame, and in moving it out and upward raise the drill from the rock, and as the arms allow it to slip back the drill falls with all its weight upon the stone.

What I claim is—

1. The combination, with a cylinder open at both ends, of a bottom hinged to the lower end of said cylinder, and cutters attached to said hinged bottom, and constructed and arranged to cut and raise the earth by imparting a rotary movement to the cylinder, substantially as set forth.

2. The combination, with a cylinder open at both ends, of a bottom hinged to the lower end of said cylinder and provided with cutters for cutting and raising the earth when the cylinder is rotated, and valves for retaining the earth within the cylinder until dumped therefrom, substantially as set forth.

3. The combination, with a cylinder open at both ends, of a dumping bottom provided with fixed and movable cutters, substantially as set forth.

4. The combination, with a cylinder open at both ends, of a dumping bottom provided with fixed and movable cutters and valves, substantially as set forth.

5. The combination, with a cylinder open at both ends, of a bottom hinged to the lower end of the cylinder, said bottom provided with an auger-point, cutters, and valves, substantially as set forth.

6. The combination, with the shaft of a well-auger, of a revolving wheel and hinged clamps for securing the shaft in place, substantially as set forth.

7. A well-auger provided with movable cutters or drills, in combination with a chamber adapted to collect the product of the drills, said cutters so pivoted to the chamber that they are enabled to cut a hole larger than the chamber, and when withdrawn from the well will require no more space than the chamber itself, substantially as and for the purpose shown.

In testimony whereof I have hereunto set my hand in the presence of two witnesses.

JOHN P. SUMMERS.

Witnesses:
JNO. CROWELL, Jr.,
WILLARD FRACKER.